United States Patent
Seino et al.

(10) Patent No.: US 7,113,211 B1
(45) Date of Patent: Sep. 26, 2006

(54) VIDEO SIGNAL PROCESSING CIRCUIT, VIEWFINDER APPARATUS, TELEVISION CAMERA, AND IMAGE MONITOR APPARATUS

(75) Inventors: Kenichi Seino, Miyagi-ken (JP);
Mitsuo Kamiko, Miyagi-ken (JP);
Tomoyasu Katsuyama, Kanagawa-ken (JP); Yoshihiro Date, Kanagawa-ken (JP); Naoki Hagiwara, Kanagawa-ken (JP)

(73) Assignees: Alps Electric Co., Ltd., Tokyo (JP);
Sony Corporation, Tokyo (JP)

( * ) Notice: Subject to any disclaimer, the term of this patent is extended or adjusted under 35 U.S.C. 154(b) by 0 days.

(21) Appl. No.: 09/516,670

(22) Filed: Mar. 1, 2000

(30) Foreign Application Priority Data

Mar. 3, 1999 (JP) .................................. 11-056227

(51) Int. Cl.
*H04N 9/64* (2006.01)
*H04N 5/208* (2006.01)
*H04N 5/21* (2006.01)

(52) U.S. Cl. ...................... 348/253; 348/252; 348/625; 348/554

(58) Field of Classification Search ................ 348/625, 348/627, 630, 252, 253, 554
See application file for complete search history.

(56) References Cited

U.S. PATENT DOCUMENTS

| | | | |
|---|---|---|---|
| 3,980,819 A * | 9/1976 | Schwartz | 348/625 |
| 4,928,181 A * | 5/1990 | Harward | 348/766 |
| 5,404,180 A | 4/1995 | Kitano et al. | |
| 5,418,574 A * | 5/1995 | Miyabata et al. | 348/625 |
| 5,638,485 A * | 6/1997 | Kobayashi et al. | 386/123 |
| 5,767,900 A * | 6/1998 | Tanji et al. | 348/253 |
| 5,953,058 A * | 9/1999 | Hanagata | 348/223.1 |
| 6,233,022 B1 * | 5/2001 | Weston et al. | 348/625 |
| 6,262,779 B1 * | 7/2001 | Sugiyama et al. | 348/704 |
| 6,377,313 B1 * | 4/2002 | Yang et al. | 348/630 |
| 6,404,936 B1 * | 6/2002 | Katayama et al. | 382/283 |
| 6,433,836 B1 * | 8/2002 | Suzuki et al. | 348/625 |
| 6,441,866 B1 * | 8/2002 | Chen et al. | 348/606 |
| 6,515,710 B1 * | 2/2003 | Koshimuta | 348/557 |
| 6,628,330 B1 * | 9/2003 | Lin | 348/252 |

* cited by examiner

*Primary Examiner*—Lin Ye
(74) *Attorney, Agent, or Firm*—Brinks Hofer Gilson & Lione

(57) ABSTRACT

A video signal processing circuit, which performs contour adjustment by means of digital signal processing, is applicable to a viewfinder apparatus for a television camera and an image monitor apparatus, which can be operated both in an NTSC/PAL system and an HDTV system. The video signal processing circuit includes a contour-adjusting circuit for performing contour adjustment by peaking R, G, and B signals or by peaking a Y signal in an HDTV system and for outputting at least one adjusted signal; an inverse matrix transforming circuit for separating, by performing inverse matrix transformation, the R, G, and B signals from the adjusted Y signal, a Pr signal, and a Pb signal and for outputting the separated R, G, and B signals; and a selecting circuit for selecting, in accordance with the type of input video signals, either the R, G, and B signals in which the contour adjustment is performed or the Y signal, in which the contour adjustment is performed, and the Pr signal and the Pb signal, in which the contour adjustment is not performed.

16 Claims, 4 Drawing Sheets

VIDEO SIGNAL PROCESSING CIRCUIT, VIEWFINDER APPARATUS, TELEVISION CAMERA, AND IMAGE MONITOR APPARATUS

BACKGROUND OF THE INVENTION

1. Field of the Invention

The present invention relates to video signal processing circuits in NTSC and PAL systems and in a high definition television (hereinafter referred to as "HDTV") system, viewfinder apparatuses including the video signal processing circuits, television cameras including the viewfinder apparatuses, and image monitor apparatuses including the video signal processing circuits.

2. Description of the Related Art

Hitherto, video signal contour-adjusting circuits have been employed to improve the resolution of an image in a viewfinder apparatus for a television camera by enhancing the contour of the image to be captured and therefore to enable a user to easily observe the image.

In general, the video signal contour-adjusting circuits separate a part of the video signal where the temporal variation is great, which in turn is amplified and added to the original signal.

To this end, a method described below has been widely used. Specifically, low-pass filters, each of which includes an inductor as a serial device and a capacitor as a parallel device of an input signal, are connected in multiple stages to generate a delayed signal of the original signal. The delayed signal is added to the original signal, and the contour is thereby emphasized.

Since the low-pass filters formed of the inductors and the capacitors are connected in multiple stages in the above method, a plurality of inductors and capacitors are required. These components are difficult to be miniaturized. When these components are mounted in a small apparatus, they are apt to pick up electromagnetic noise generated by peripheral devices. Therefore, it is necessary to construct an electromagnetic shielding. Hence, the cost of such an apparatus is high.

If an amplification degree is increased so as to strongly perform contour adjustment by the contour-adjusting circuit, a circuit is more apt to oscillate and an operation of the apparatus becomes unstable.

If the apparatus is a television camera both in an NTSC/PAL system and an HDTV system, it is necessary to arrange a plurality of contour-enhancing circuits since frequency bands of the video signals and signal processing methods differ according to the systems. It is thus difficult for the television camera to be miniaturized and low-cost.

SUMMARY OF THE INVENTION

Accordingly, it is an object of the present invention to provide a video signal processing circuit for performing stable contour enhancement by means of digital signal processing, which can be used for a television camera both in an NTSC/PAL system and an HDTV system, a viewfinder apparatus, a television camera, and an image monitor apparatus.

According to one aspect of the present invention, there is provided a video signal processing circuit including a contour-adjusting circuit for performing contour adjustment by peaking red (R), green (G), and blue (B) signals among video signals in an NTSC system or a PAL system or by peaking only a Y signal (luminance signal) among transmission color signals in a high definition television system and for outputting at least one adjusted signal; an inverse matrix transforming circuit for separating, by performing inverse matrix transformation, the R, G, and B signals from the adjusted Y signal, a Pr signal, and a Pb signal (color-difference signals) among the transmission color signals and for outputting the separated R, G, and B signals; and a selecting circuit for selecting, in accordance with the type of input video signals, either the R, G, and B signals in which the contour adjustment is performed or the Y signal, in which the contour adjustment is performed, and the Pr signal and the Pb signal, in which the contour adjustment is not performed.

The video signal processing circuit may further include a determining unit for determining whether the contour adjustment is normally performed and for outputting a control signal for controlling the selecting circuit.

As described above, each of the R, G, and B video signals in the NTSC/PAL system is peaked, and the contour adjustment is thereby performed. In the HDTV system, only the Y signal is peaked. Subsequently, inverse matrix transformation of the peaked Y signal, the Pr signal, and the Pb signal is performed to generate the R, G, and B signals.

When the above video signal processing circuit is applied to a viewfinder apparatus for a television camera, a visual field frame can be clearly displayed, thus improving visibility in focusing.

The video signal processing circuit according to an embodiment of the present invention may be applied to an image monitor apparatus, thus providing an image monitor with high visibility in which the contour of an image is clearly displayed.

DESCRIPTION OF THE PREFERRED EMBODIMENTS

The present invention will be understood from the following description of the preferred embodiments with reference to the accompanying drawings.

Figure 1:
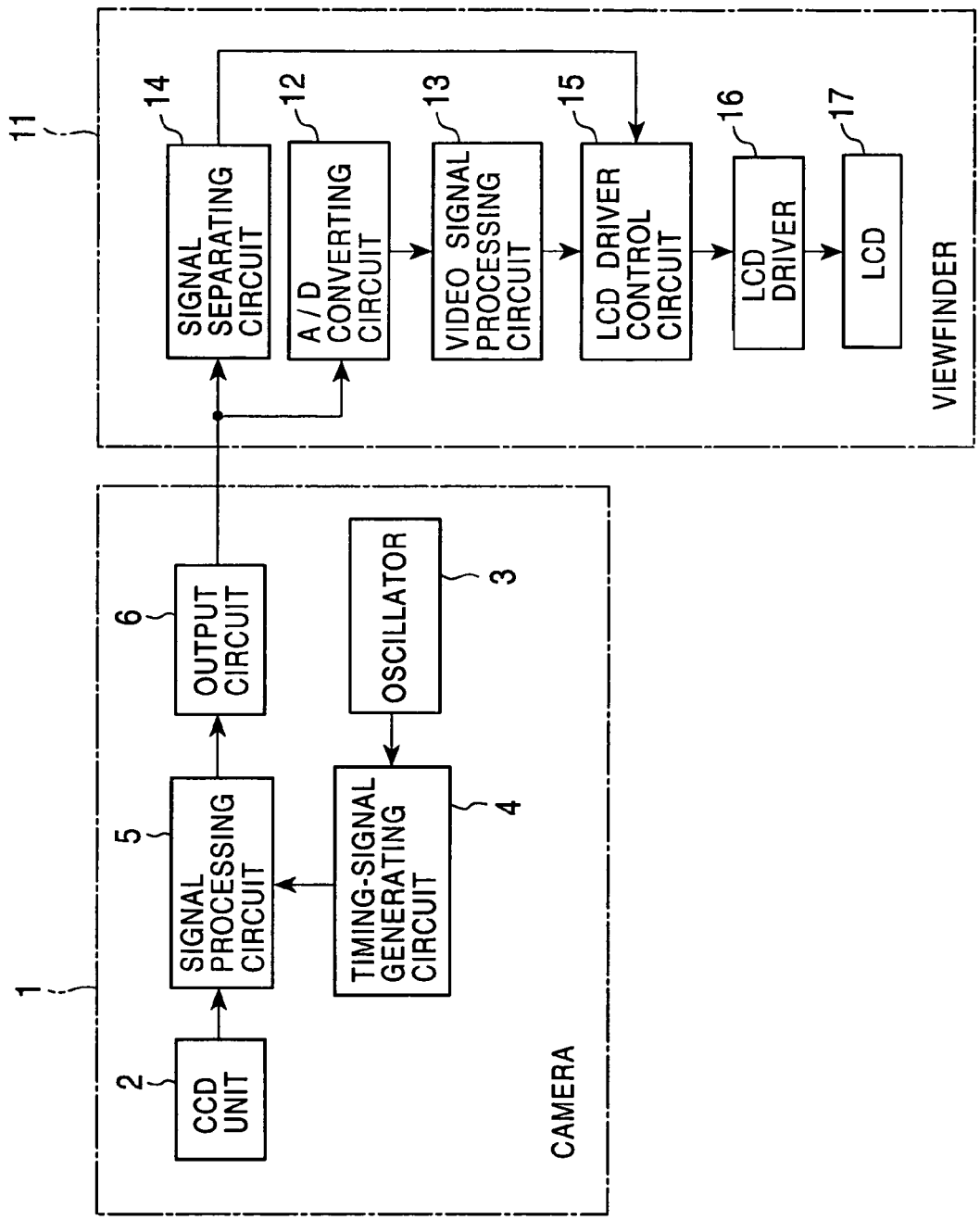
FIG. 1 is a block diagram of a television camera including a video signal processing circuit according to an embodiment of the present invention.

FIG. 1 is a block diagram of a television camera including a video signal processing circuit according to an embodiment of the present invention.

Referring to FIG. 1, the television camera includes a camera 1. A charge-coupled device (CCD) unit 2 captures image data obtained through a lens (not shown), which in turn is input as an electrical signal to a signal processing circuit 5 operated by a timing signal generated by an oscillator 3 and a timing-signal generating circuit 4. The electrical signal passes through an output circuit 6 and is output as a Y signal, a Pr signal, and a Pb signal in an HDTV system, or as R, G, B video signals in an NTSC/PAL system.

These signals are converted to digital signals by an A/D converting circuit 12 of a viewfinder 11, and the converted digital signals are input to a video signal processing circuit 13. The video signal processing circuit 13 is the core of the present invention.

The signals output from the output circuit 6 are also input to a signal separating circuit 14 to generate a synchronization signal. The synchronization signal synchronizes a liquid crystal display (LCD) driver control circuit 15, to which the video signals adjusted/converted by the video signal processing circuit 13 are input.

An output signal from the LCD driver control circuit 15 controls the timing of an LCD driver 16 and drives an LCD 17 to performs predetermined image display.

Figure 2:
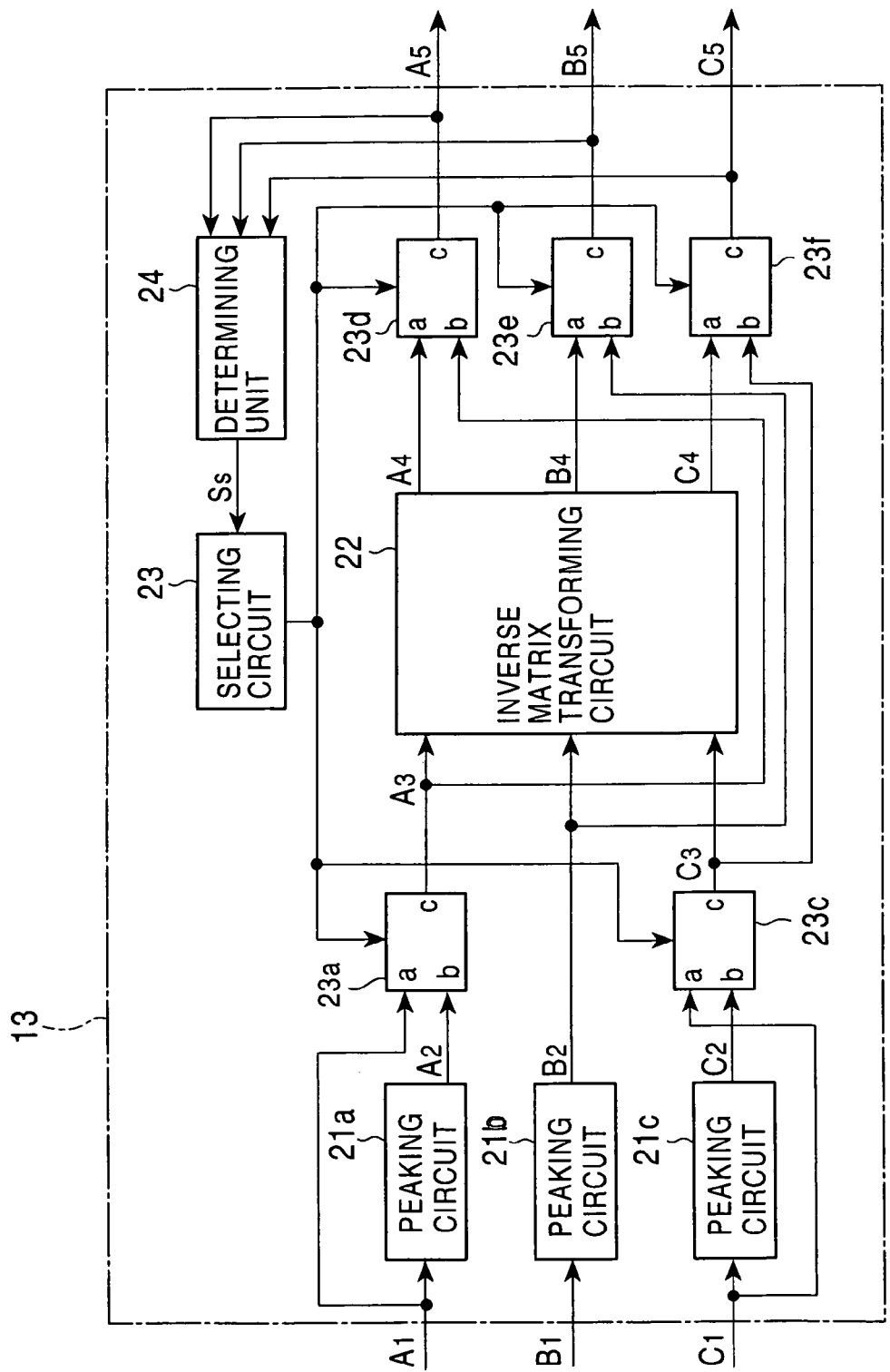
FIG. 2 is a block diagram of an internal construction of the video signal processing circuit shown in FIG. 1.

Referring now to FIG. 2, the video signal processing circuit 13 is described.

FIG. 2 is a block diagram of the internal construction of the video signal processing circuit 13. The video signal processing circuit 13 includes a first peaking circuit 21a for performing peaking processing of the R signal and the Pr signal (the Pr signal is not used at an output end) among the video signals, a second peaking circuit 21b for performing peaking processing of the G signal and the Y signal, and a third peaking circuit 21c for performing peaking processing of the B signal and the Pb signal (the Pb signal is not used at an output end).

The video signal processing circuit 13 further includes an inverse matrix transforming unit 22 for separating video signals from the Y signal, which is peaked by the peaking circuit 21b, and from the Pr and Pb signals, and a selecting circuit 23 for selecting circuit connections in accordance with the type of input signals.

The selecting of circuit connections is performed by selecting switches 23a, 23c, 23d, 23e, and 23f, which are driven simultaneously by the selecting circuit 23.

The selecting switches 23a, 23c, 23d, 23e, and 23f may be mechanical switches, or alternatively, semiconductor switches. Operations of the selecting switches 23a, 23c, 23d, 23e, and 23f, in which either an a-side or a b-side is selected to be connected to c, are controlled by the selecting circuit 23 and the signals are thus relayed.

The selecting switch 23a is operated by the selecting circuit 23 such that, when the input signals are the R, G, and B video signals, the b-side of the selecting switch 23a is selected to be connected to c, and when the input signals are the HDTV signals, the a-side of the selecting switch 23a is selected to be connected to c. The signals are therefore relayed to the output end. The other selecting switches 23c, 23d, 23e, and 23f operate in the same manner as the selecting switch 23a.

A determining unit 24 determines whether output signals $A_5$, $B_5$, and $C_5$ are formatted in a predetermined format. The determination is negative when the type of the input signals (the HDTV system of the Y, Pr, and Pb signals or the NTSC/PAL system of the R, G, and B signals) does not match a signal processing method described below. In such a case, a control signal Ss is sent to the selecting circuit 23 to cause the selecting switches 23a, 23c, 23d, 23e, and 23f to switch the connection to the opposite side, thus changing over the signal processing method.

As shown in FIG. 2, when the HDTV Pr signal as a signal $A_1$, the HDTV Y signal as a signal $B_1$, and the HDTV Pb signal as a signal $C_1$ are input to the video signal processing circuit 13, the following operation is performed. The signal $B_1$ is peaked by the peaking circuit 21b and becomes a signal $B_2$. For the signals $A_1$ and $C_1$, the control signal Ss to the selecting circuit 23 causes the selecting switches 23a and 23c to connect the a-side to c, and the signals $A_1$ and $C_1$ become signals $A_3$ and $C_3$, respectively. Subsequently, the signals $A_3$, $B_2$, and $C_3$ are input to the inverse matrix transforming circuit 22.

The inverse matrix transforming circuit 22 performs predetermined subtraction/addition processing of each of the input signals. The signals are then converted to video signals $A_4$, $B_4$, and $C_4$. Each of the selecting switches 23d, 23e, and 23f select the a-side to be connected to c, and contour-adjusted video signals $A_5$, $B_5$, and $C_5$ are input to the LCD driver control circuit 15 shown in FIG. 1.

In contrast, when the NTSC/PAL R, G, and B video signals are input to the video signal processing circuit 13 as the signals $A_1$, $B_1$, and $C_1$, respectively, as shown in FIG. 2, the peaking circuits 21a, 21b, and 21c perform peaking processing of the signals $A_1$, $B_1$, and $C_1$ and output the signals $A_2$, $B_2$, and $C_2$, respectively. The signal $B_2$ is directly input to the selecting switch 23e, which selects the b-side to be connected to c. Regarding the signals $A_2$ and $C_2$, the control signal Ss to the selecting circuit 23 causes the selecting switches 23a and 23c to select the b-side to be connected to c, and furthermore, the selecting switches 23d, 23e and 23f select the b-side to be connected to c. Hence, the contour-adjusted video signals $A_5$, $B_5$, and $C_5$ are input to the LCD driver control circuit 15 shown in FIG. 1.

Accordingly, appropriate contour adjustment is performed for the input signals, which may be in either the HDTV system or the NTSC/PAL system, and an image of high visibility is thereby obtained.

Figure 3:
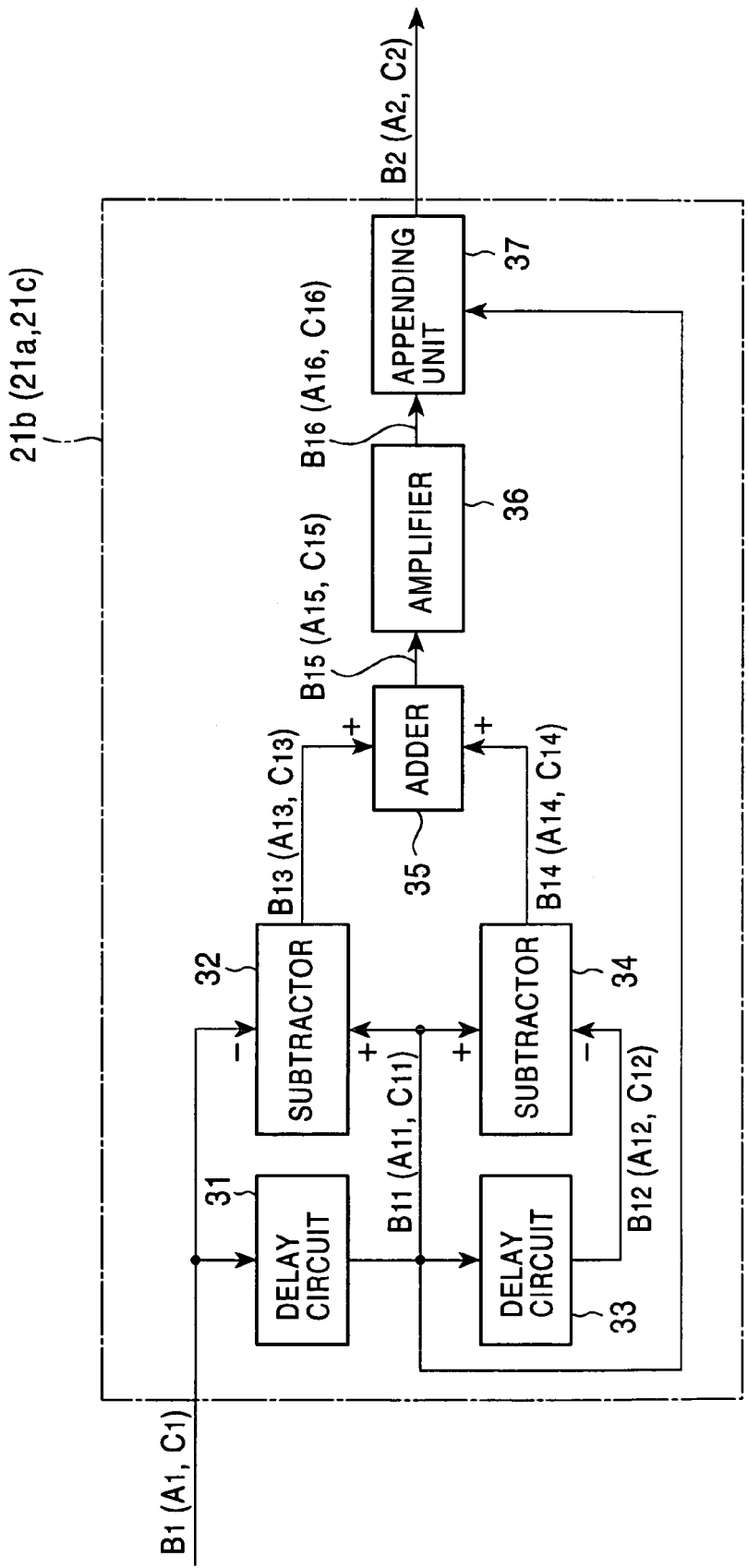
FIG. 3 is a block diagram of an internal construction of a peaking circuit shown in FIG. 2.

FIG. 3 is a block diagram of the internal construction of processing circuits employed in the second peaking circuit 21b among the first, second, and third peaking circuits 21a, 21b, and 21c, which is used in both the HDTV system and the NTSC/PAL system.

The first and third peaking circuits 21a and 21c are equivalent to the second peaking circuit 21b. In FIG. 3, the reference numerals corresponding to the first and third peaking circuits 21a and 21c are provided in parentheses.

Figure 4:
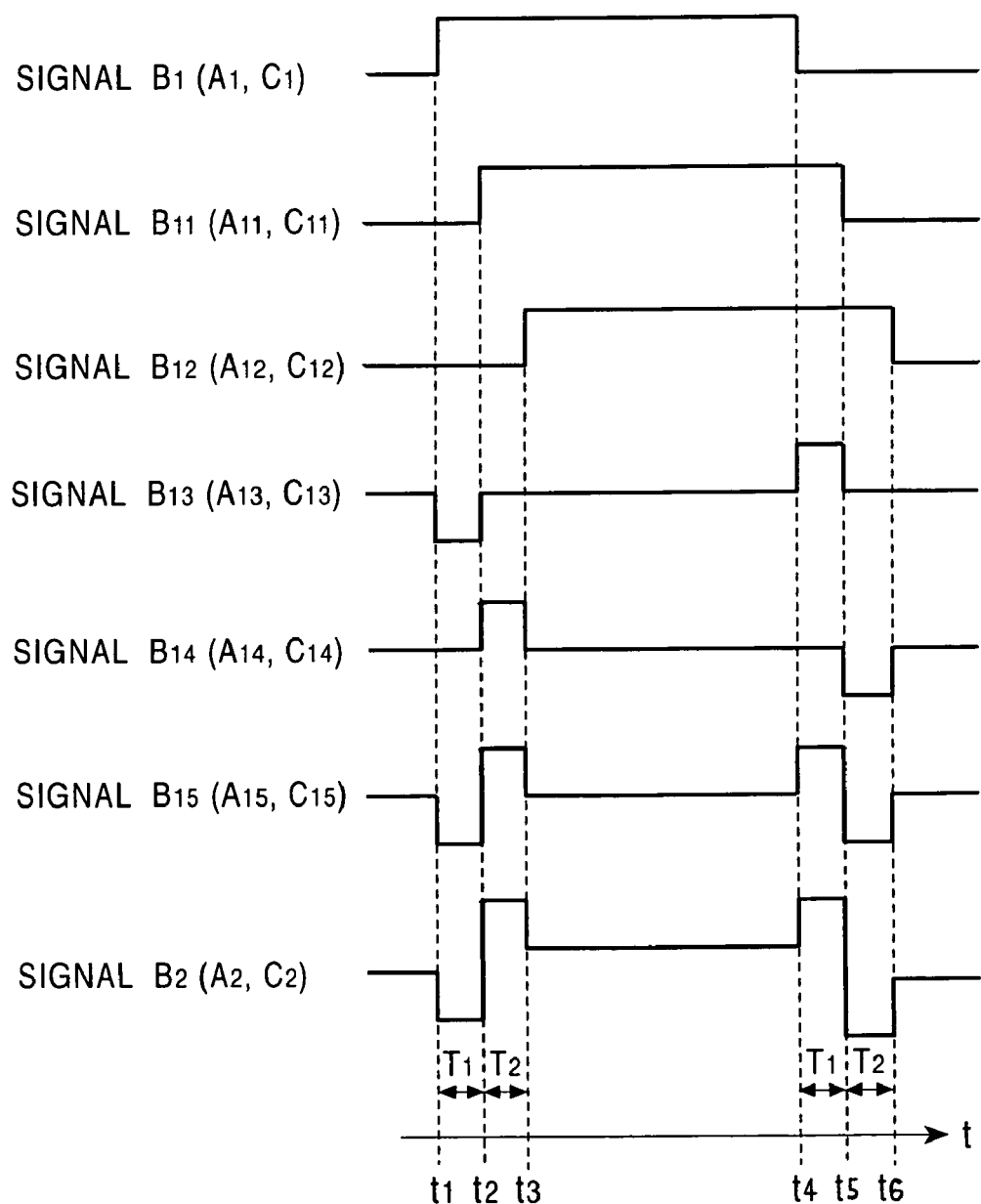
FIG. 4 is a waveform chart showing a signal at each unit of the peaking circuit shown in FIG. 3.

FIG. 4 is a waveform chart showing a signal at each unit of the peaking circuit shown in FIG. 3.

Referring to FIG. 3, a G/Y signal is input as a signal $B_1$. When the signal $B_1$ reaches a high level at time $t_1$, a first delay circuit 31 formed by cascade-connecting at least one D-type flip-flop delays the signal $B_1$ for a time period $T_1$ from time $t_1$, thus generating a signal $B_{11}$ that reaches a high level at time $t_2$. The delayed signal $B_{11}$ and the above input signal $B_1$ are input to a first subtractor 32. Subtraction processing is performed, and a signal $B_{13}$ is generated as a subtraction result.

The signal $B_{11}$ delayed by the first delay circuit 31 is also input to a second delay circuit 33 formed by cascade-connecting at least one D-type flip-flop. The delay circuit 33 delays the signal $B_{11}$ for a predetermined time period $T_2$, thus generating a signal $B_{12}$ that reaches a high level at time $t_3$. The delayed signal $B_{12}$ and the delayed signal $B_{11}$ delayed by the first delay circuit 31 are input to a second subtractor 34. Subtraction processing is performed, and a signal $B_{14}$ is generated as a subtraction result.

The signal $B_{13}$ output from the first subtractor 32 and the signal $B_{14}$ output from the second subtractor 34 are added in an adder 35, and a signal $B_{15}$ is generated as an addition result. The signal $B_{15}$ is amplified by an amplifier 36 to form a signal $B_{16}$. An appending unit 37 appends the signal $B_{11}$ output from the first delay circuit 31 to the signal $B_{16}$, and the peaked signal $B_2$ is output.

Rising of the original signal is described hereinabove. Falling of the original signal performs similar operations at times $t_4$, $t_5$, and $t_6$ in FIG. 4.

FIG. 4 shows waveforms of these signals and temporal relationships among them. Details of these operations are described in Japanese Patent Application No. 10-244181.

The video signal processing circuit according to the embodiment has been described hereinabove. The video signal processing circuit is applicable to a viewfinder apparatus for a television camera.

In addition, the video signal processing circuit may be applied to an image monitor apparatus.

It should be understood by those skilled in the art that the present invention is not limited to the embodiments and that various changes and modifications, such as design changes, may be made in the invention without departing from the spirit and scope thereof.

In the embodiments, for example, the determining unit automatically switches the signal processing method in accordance with the type of the input signal. Generally, the type of the input signal is often known in advance. Therefore, an operator of a camera or the like may manually switch the signal processing method so as to simplify the operation.

What is claimed is:

1. A video signal processing circuit comprising:
an input terminal receiving one of NTSC video signals, PAL video signals and high definition television transmission color signals;
a contour-adjusting circuit configured to receive one of the NTSC video signals, the PAL video signals and the high definition television transmission color signals from the input terminal and peak the received signals for contour adjustment, wherein the contour adjusting circuit further comprises at least one peaking circuit that is configured to peak either the R, G and B signals from video signals in either the NTSC system or the PAL system or only the Y signal from the high definition television transmission color signals;
an inverse matrix transforming circuit for separating R, G and B signals from the high definition television transmission color signals;
a selecting circuit that controls adjusted NTSC video signals and adjusted PAL signals to bypass the inverse matrix transforming circuit;
a determining unit that produces a control signal, wherein in response to the control signal, the selecting circuit changes selection of the at least one switch to relay either the R, G, and B signals in which contour adjustment is performed or the Y signal, in which the contour adjustment is performed, and the Pr signal and the Pb signal, in which contour adjustment is not performed;
a plurality of selecting switches configured to be driven simultaneously, wherein the each selecting switch is operated by the selecting circuit that, when the input signals are the R, G, and B signals, the side of the signal peaked by the peaking circuit is selected to be connected to the inverse matrix transforming circuit side, and when the input signals are the HDTV signals, the side of the signal not peaked by the peaking circuit is selected to be connected to the inverse matrix transforming circuit side; and
an output terminal outputting video signals that include contour-adjusted R, G and B signals.

2. A viewfinder apparatus for a television camera, comprising a display device using a video signal processing circuit as set forth in claim 1.

3. A television camera comprising a viewfinder apparatus as set forth in claim 2.

4. An image monitor apparatus comprising a display device using a video signal processing circuit as set forth in claim 1.

5. The video signal processing circuit as set forth in claim 1, wherein the at least one peaking circuit receives as an input the R, G or B signal from video signals in one of the NTSC system and the PAL system.

6. The video signal processing circuit as set forth in claim 1, wherein one peaking circuit receives as an input the Y signal from transmission color signals in the high definition television system.

7. The video signal processing circuit as set forth in claim 6, wherein the Pr signal and the Pb signal are directly inputted to the inverse matrix transforming circuit.

8. The video signal processing circuit as set forth in claim 5, wherein each peaking circuit includes at least one delay circuit that delays the input signal and delayed signals; at least one subtractor that subtracts delayed signals from the input signal, at least one adder that adds subtracted signals, at least one amplifier that amplifies added signals, and an appending circuit that appends the delayed signals to amplified signals to form a peaked signal.

9. The video signal processing circuit as set forth in claim 6, wherein each peaking circuit includes at least one delay circuit that delays the input signal and delayed signals; at least one subtractor that subtracts delayed signals from the input signal, at least one adder that adds subtracted signals, at least one amplifier that amplifies added signals, and an appending circuit that appends the delayed signals to amplified signals to form a peaked signal.

10. A video signal processing circuit, comprising:
an input terminal inputting one of NTSC video signals, PAL video signals and high definition television transmission color signals, wherein the NTSC video signals and the PAL video signals include R, G and B signals and the high definition television transmission color signals include a Y signal, a Pr signal and a Pb signal;
a contour-adjusting circuit configured to receive one of the NTSC video signals, the PAL video signals and the high definition television transmission color signals from the input terminal and peak the received signals for contour adjustment; and
an inverse matrix transforming circuit for separating R, G and B signals from an adjusted Y signal, the Pr signal and the Pb signal; and
a determining unit producing a control signal, wherein in response to the control signal, the selecting circuit changes selection of the at least one switch in order to relay either the R, G, and B signals in which contour adjustment is performed or the Y signal, in which the contour adjustment is performed, and the Pr signal and the Pb signal, in which contour adjustment is not performed;
wherein the contour-adjusting circuit is operable to process the R, G and B signals in one of a NTSC system and a PAL system and the Y signal in a high definition television system.

11. The video signal processing circuit as set forth in claim 10, wherein the Pr signal and the Pb signal bypass the contour-adjusting circuit and are directly inputted into the inverse matrix transforming circuit.

12. The video signal processing circuit as set forth in claim 10, further comprising a selecting circuit that selects circuit connection in accordance with the type of input signals.

13. The video signal processing circuit as set forth in claim 12, further comprising a plurality of selecting switches configured to be driven simultaneously by the selecting circuit.

14. The video signal processing circuit as set forth in claim 13, wherein at least one selecting switch includes at least two input terminals, a first input terminal configured to receive one of the NTSC video signals and the PAL video signals and a second input terminal configured to receive the high definition television transmission signals.

15. The video signal processing circuit as set forth in claim 14, wherein in accordance with the type of input signals, the selecting circuit drives the selecting switch to connect one of the first input terminal and the second input terminal to an output terminal.

16. The video signal processing circuit as set forth in claim 15, wherein in response to one of the NTSC video signals and the PAL video signals, the selecting circuit drives the first input terminal of the selecting switch to be connected to the output terminal, and in response to the high definition television transmission signal, the selecting circuit drives the second input terminal of the selecting switch to be connected to the output terminal.

* * * * *